United States Patent [19]
Spease

[11] Patent Number: 4,811,621
[45] Date of Patent: Mar. 14, 1989

[54] REMOTE CONTROL ASSEMBLY TRANSMISSION SEAL

[75] Inventor: Arthur L. Spease, Livonia, Mich.

[73] Assignee: Teleflex Incorporated, Limerick, Pa.

[21] Appl. No.: 40,749

[22] Filed: Apr. 20, 1987

Related U.S. Application Data

[63] Continuation-in-part of Ser. No. 876,107, Jun. 19, 1986, abandoned.

[51] Int. Cl.⁴ ............................................. F16C 1/10
[52] U.S. Cl. ............................. 74/501.5 R; 74/502.4; 403/288
[58] Field of Search ............... 74/501 D, 501 R, 502, 74/501 F, 503, 501 SR; 16/2; 174/77 R; 403/366, 372; 285/162, 80; 248/27.3, 56; 277/24, 31, 37, 102, 123, 124, 125, 165, 207 R, 177, 173, DIG. 6

[56] References Cited

U.S. PATENT DOCUMENTS

| | | | |
|---|---|---|---|
| 2,371,705 | 3/1945 | O'Connor | 74/501.5 H |
| 2,732,861 | 1/1956 | Gilmore | 74/501 D X |
| 3,164,400 | 1/1965 | Weaver | 74/501 D |
| 3,240,502 | 3/1966 | Snyder | 248/56 X |
| 3,244,802 | 4/1966 | Sturtevant | 16/2 X |
| 3,572,159 | 3/1971 | Tschanz | 74/501 D |
| 3,582,093 | 6/1971 | Lucien | 277/177 |
| 3,836,269 | 9/1974 | Koscik | 16/2 X |
| 3,999,894 | 12/1976 | Nakayama et al. | 277/177 X |
| 4,079,950 | 3/1978 | Langford | 74/502 X |
| 4,093,241 | 6/1978 | Muntjanoff et al. | 74/502 X |
| 4,175,450 | 11/1979 | Bennett | 74/501 D |
| 4,188,836 | 2/1980 | Muller | 74/501 D |
| 4,304,149 | 12/1981 | Heimann | 74/501 D |
| 4,354,651 | 10/1982 | Simon | 248/56 |
| 4,358,079 | 11/1982 | Navarro | 248/56 |
| 4,496,161 | 1/1985 | Fischer | 277/177 X |
| 4,559,248 | 12/1985 | Sumiyoshi et al. | 277/DIG. 6 X |
| 4,629,200 | 12/1986 | Ruddy | 277/DIG. 6 X |

FOREIGN PATENT DOCUMENTS

| | | | |
|---|---|---|---|
| 362067 | 8/1938 | Italy | 74/501 D |
| 56-76713 | 6/1981 | Japan | 74/501 D |
| 560937 | 4/1944 | United Kingdom | 74/501 D |
| 978314 | 12/1964 | United Kingdom | 64/501 D |

Primary Examiner—Gary L. Smith
Assistant Examiner—Rodney M. Lindsey
Attorney, Agent, or Firm—Reising, Ethington, Barnard, Perry & Milton

[57] ABSTRACT

A motion transmitting remote control assembly (10) for transmitting motion in a curved path by a flexible core element (14) and including a housing means comprising two tubular portions (24, 26). One of the tubular portions (24) is adapted for attachment to a fluid reservoir wall. A flexible conduit (12) is slideably disposed within the second tubular portion (26). The assembly is characterized by including sealing means comprising O-ring means and a conical swivel cover (34). In one embodiment, the conical swivel cover (34) expands in response to fluid contact to prevent fluid flow from the reservoir and about the conduit (12). In a second embodiment, an O-ring (18) expands in response to fluid contact to prevent such fluid flow.

24 Claims, 2 Drawing Sheets

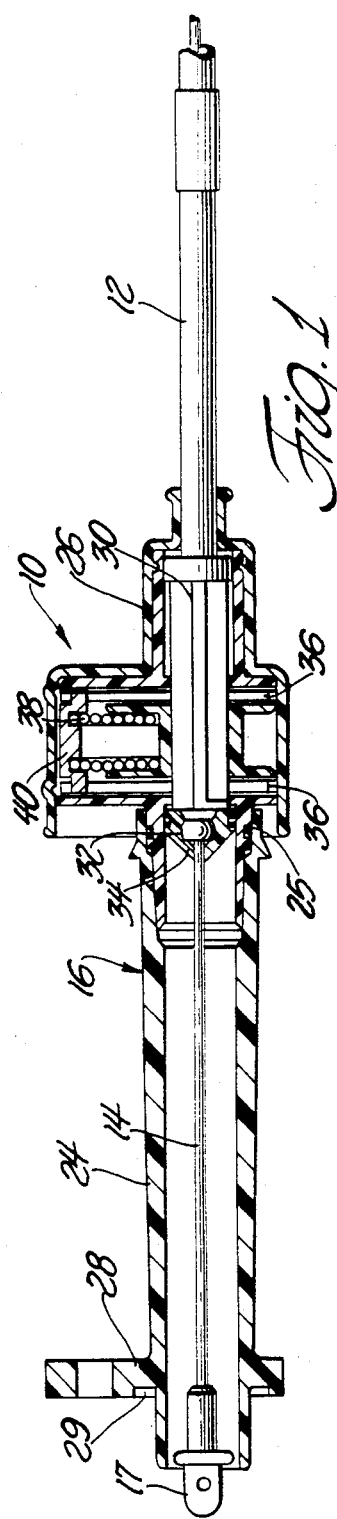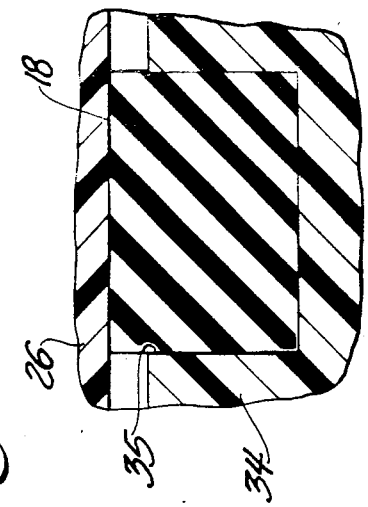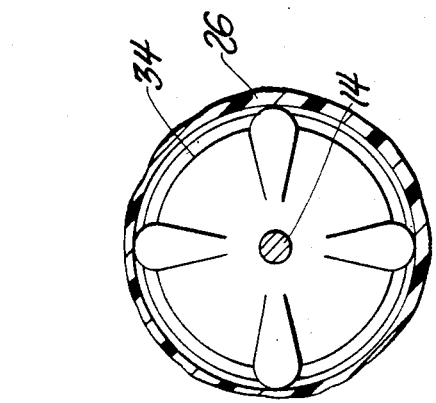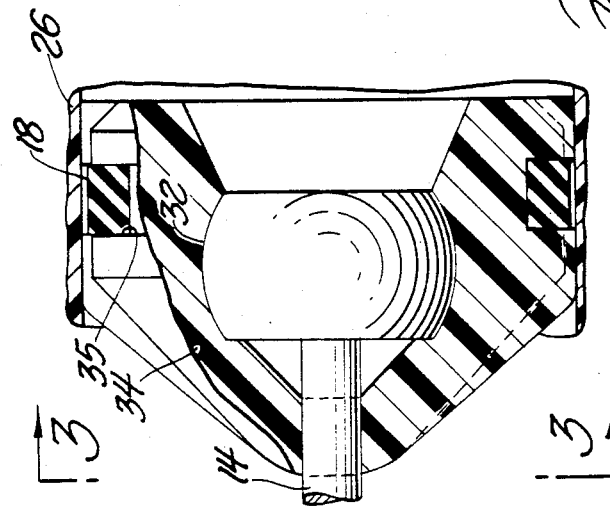

4,811,621

REMOTE CONTROL ASSEMBLY TRANSMISSION SEAL

This application is a continuation-in-part of application Ser. No. 876,107, filed 6-19-86, now abandoned.

TECHNICAL FIELD

The present invention relates to a remote control assembly of the type for transmitting motion in a curved path.

BACKGROUND ART

In the past, remote control assemblies including conduit length adjustment means have been used in many applications. One such application is used to control transmissions. In such applications, a housing is attached to a fluid reservoir and a flexible push-pull core element extends from the housing and into the reservoir. The assembly is complicated by including a means for adjusting the length of the conduit. A problem exists in preventing the fluid from the reservoir from leaking out of the reservoir and about the conduit.

STATEMENT OF THE INVENTION AND ADVANTAGES

According to the present invention, a motion transmitting remote control assembly of the type for transmitting forces along a curved path by a motion transmitting core element is provided. The assembly comprises a flexible conduit having first and seconds ends, a flexible motion transmitting core element is movably supported by the conduit with ends thereof extending from the ends of the conduit, and a housing means having a first end for sealing engagement about an opening in a wall of a fluid reservoir and defining a sealed housing surrounding the core element and extending to a second end thereof. The core element extends through the housing means for extension out of the first end of the housing means and into the fluid reservoir. The first end of the conduit is slideably disposed within the second end of the housing means. The assembly is characterized by including sealing means, disposed between the housing means and the conduit, for expanding in response to fluid contact to prevent the fluid flow from the reservoir and about the conduit.

Accordingly, the present invention prevents the fluid from flowing from a reservoir about a conduit of a motion transmitting remote control assembly.

FIGURES IN THE DRAWINGS

Other advantages of the present invention will be readily appreciated as the same becomes better understood by reference to the following detailed description when considered in connection with the accompanying drawings wherein:

FIG. 1 is an elevational cross-sectional view of the preferred embodiment of the present invention;

FIG. 2 is an expanded view of the conical swivel cover;

FIG. 3 is a front view taken substantially along line 3—3 of FIG. 2;

FIG. 4 is an enlarged view of the sealing means;

DETAILED DESCRIPTION OF THE DRAWINGS

Figure 5:
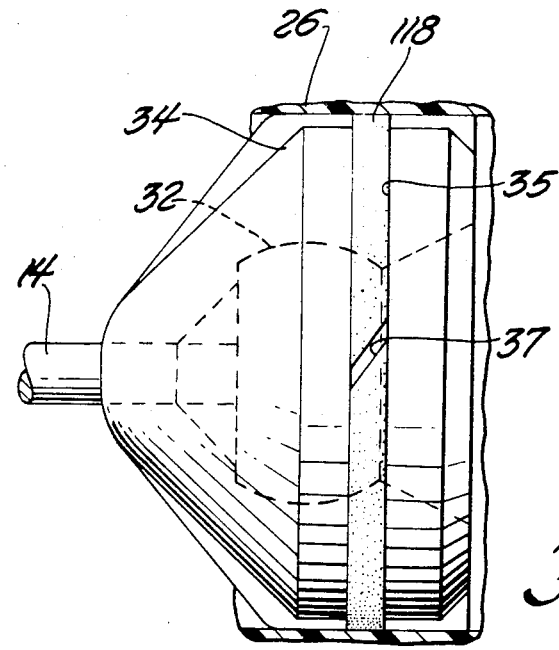
FIG. 5 is an expanded elevational view of the conical swivel cover.

A motion transmitting remote control assembly of the type for transmitting forces along a curved path by a motion transmitting core element is generally shown at 10. The assembly 10 includes a flexible conduit 12 having first and second ends and a flexible motion transmitting core element 14 moveably supported by the conduit 12 with the ends of the core element 14 extending from the ends of the conduit 12. The assembly 10 further includes a housing means generally indicated at 16 having a first end for sealing engagement about an opening in a wall of a fluid reservoir and extending to a second end. The first end of the conduit 12 is slideably disposed within the second end of the housing means 16. The housing means 16 defines a sealed housing surrounding the core element 14.

The core element 14 extends through the housing means 16 for extension out of the first end of the housing means 16 and into the fluid reservoir (not shown). A fitting 17 is attached to the end of the core element 14 and is adapted to receive a control member located within the reservoir.

The housing means 16 includes a tubular length surrounding the core element 14 and a mounting means for attachment to the reservoir wall. The tubular length comprises first and second tubular portions 24, 26. The second tubular portion 26 is fixedly engaged partially within the first portion 24. An O-ring 25 is disposed between the first and second tubular portions 24, 26 to prevent fluid from flowing into or out of the housing 16. The mounting means includes a flange 28 extending radially outwardly from the first tubular portion 24 to connect the housing means 16 to the reservoir wall. The flange 28 is spaced from the end of the first tubular portion to provide for mounting stability when mounting the housing means 16 to the reservoir wall. The flange 28 is sealed by a hat section seal disposed in a groove 29 to prevent fluid from flowing out of the reservoir past the flange 28.

The assembly 10 further includes a slider member 30 which is disposed about the first end of the conduit 12 to adjust the overall length of the conduit. The second tubular portion 26 surrounds the slider member 30. The slider member includes a swivel support 32 and a conical swivel cover 34. The conical swivel cover 34 is supported on the swivel support 32. The conical swivel cover 34 is in wiping engagement with the core element 14, to wipe the core element as it passes through the cover 34. This prevents foreign particulate matter from entering the conduit 12 or the fluid reservoir.

The assembly 10 further includes a latching means engageable with the slider member 30 for controlling the longitudinal movement of the slider member 30. The latching means includes latch members 36 which engage the slider member 30. A biasing means comprising a spring 38 is also provided. A cap 40 which is biased by the spring 38 is engaged with the latch members 36 and urges the latch members 36 into engagement with the slider member 30 to thereby limit longitudinal movement of the slider member 30. A manual force can be exerted to the cap 40 to overcome the biasing of the spring 38. Since the cap 40 engages the latch members 36, the force removes the latch members 36 from engagement with the slider member 30, allowing movement of the slider member 30 thereby adjusting the overall length of the conduit.

Figure 6:
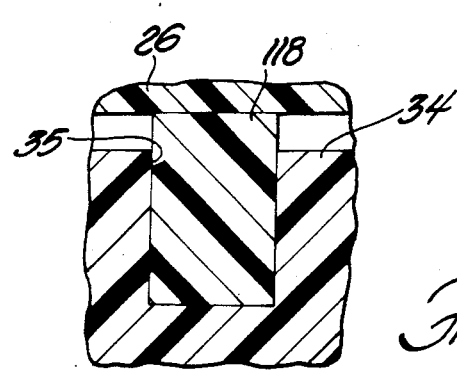
FIG. 6 is an enlarged view of the sealing means before fluid contact.

The assembly 10 is characterized by including a sealing means disposed between the housing means 16 and the conduit 12. The sealing means comprises O-ring means and a conical swivel cover 34 disposed between the second tubular portion 26 of the tubular length and the conduit 12. The conical swivel cover 34 includes an annular groove 35 in which the O-ring means is disposed. The O-ring means includes an O-ring 118 initially snugly engaged with the interior of the second tubular portion 26. Alternatively, the O-ring means includes an O-ring 18 having an outside diameter slightly less than the diameter of the interior of the second tubular portion 26. In one preferred embodiment a split O-ring 118 made of an organic polymeric material such as TFE or any material which provides slideability is disposed in the annular groove 35 of the conical swivel cover 34. The O-ring 118 has a substantially rectangular cross section. The split O-ring 118 is of a larger diameter than the swivel cover 34, as best shown in FIG. 6. The O-ring 118 initially engages the interior of the second tubular portion 26 the tubular length. Since the O-ring 118 is made of TFE, it slides easily within the second tubular portion 26 of the tubular length, thus facilitating easier slideability of the slider member 30. The split 37 in the O-ring 118 is best shown in FIG. 5. The split 37 in the O-ring 118 is for opening the O-ring 118 so it can be easily installed in the annular groove 35 of the swivel cover 34.

Figure 7:
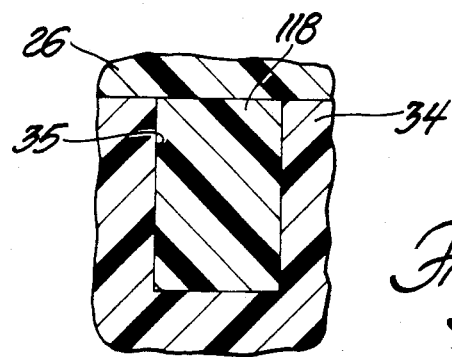
FIG. 7 is an enlarged view of the sealing means after fluid contact.

In the first embodiment, the swivel cover 34 is made of a material, such as that sold under the trademark Sanoprene sold by Mansanto or any elastomer sensitive to the fluid in the reservoir which expands in response to fluid contact. When fluid comes into contact with the swivel cover 34, the cover 34 swells and engages the interior of the second tubular portion 26 of the tubular length with a greater sealing force than the O-ring 118, as best shown in FIG. 7. A radial space is produced annularly about the groove 35 between the bottom of the O-ring 118 and the bottom of the grooves 35 to allow for expansion of the cover 34 without change in dimension of the O-ring 118.

In a second preferred embodiment, the O-ring means comprises an O-ring 18 disposed in the annular groove 35 of the swivel cover 34. The O-ring 18 is made of a material, such as that sold under the trademark SANOPRENE, which is expandable in response to fluid contact. The O-ring 18 defines the fluid responsive portion and is expandable in response to fluid contact therewith for engaging the interior of the tubular length with a greater sealing force than initially. The O-ring 18 further engages the interior of the tubular length with a greater sealing force than the conical swivel cover. As the O-ring 18 is inserted in the annular grove 35 of the swivel cover 34 it initially does not contact the interior of the housing 16 with as much force as it does after being contacted by fluid.

In operation, the sealing means is disposed between the second tubular portion 26 and the conduit 12. The second tubular portion 26 is then snapped into engagement with the first tubular portion 24. The housing means 16 is then attached to the wall of the fluid reservoir. The O-ring 118 is initially snugly engaged between the housing means 16 and the conduit 12 so the swivel cover 34 slides easily inside the second tubular portion 26. Alternatively, the O-ring 18 may be of slightly less diameter than the inside of the second tubular portion 26 for ease of installation. When the fluid contacts the swivel cover 34 in one embodiment, or the O-ring 18 in an alternate embodiment the swivel cover 34 or the O-ring 18 expands in response to such fluid contact. The swivel cover 34 or the O-ring 18 then becomes snugly engaged between the housing 16 and the conduit 12 to prevent fluid from flowing from the reservoir and about the conduit.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10) of the type for transmitting forces along a curved path by a motion transmitting core element, said assembly comprising; a flexible conduit (12) having first and second ends, a flexible motion transmitting core element (14) moveably supported by said conduit (12) with the ends thereof extending from said ends of said conduit (12), housing means (16) having a first end for sealing engagement about an opening in a wall of a fluid reservoir and defining a sealed housing surrounding said core element (14) and extending to a second end thereof, said core element (14) extending through said housing means (16) for extension out of said first end of said housing means and into the fluid reservoir, said first end of said conduit (12) being slideably disposed within said second end of said housing means (16), said assembly (10) characterized by including sealing means disposed between said housing means (16) and said conduit (12) for expanding by swelling in response to fluid contact to prevent fluid flow from the reservoir and about said conduit (12).

2. An assembly as set forth in claim 1 further characterized by said housing means (16) including a tubular length surrounding said core element and mounting means for attachment to the reservoir wall.

3. An assembly as set forth in claim 2 further characterized by said sealing means comprising O-ring means and a conical swivel cover (34) disposed between said tubular length and said conduit (12) for preventing fluid flow about said conduit (12).

4. An assembly as set forth in claim 3 further characterized by said conical swivel cover (34) including an annular groove (35).

5. An assembly as set forth in claim 4 further characterized by said O-ring means being disposed within said groove (35).

6. An assembly as set forth in claim 5 further characterized by one of said conical swivel cover (34) and said O-ring means being expandable in response to fluid contact therewith for engaging the interior of said tubular length (16) with a greater sealing force than the other of said swivel cover (34) and said O-ring means.

7. An assembly as set forth in claim 6 further characterized by said O-ring means including an O-ring (118) initially snugly engaged with the interior of said tubular length.

8. An assembly as set forth in claim 7 further characterized by said O-ring initially having greater sealing force than said conical swivel cover.

9. An assembly as set forth in claim 8 further characterized by said conical swivel cover (34) being expandable in response to fluid contact therewith for engaging the interior of said tubular length with a greater sealing force than said O-ring (118).

10. An assembly as set forth in claim 7 further characterized by said O-ring (18) defining said fluid responsive portion and being expandable in response to fluid contact therewith for engaging the interior of said tubular length with a greater sealing force than initially.

11. An assembly as set forth in claim 7 further characterized by said O-ring (18, 118) having a rectangular cross section.

12. An assembly as set forth in claim 11 further characterized by said tubular length comprising first and second tubular portions (24, 26), said second portion (26) fixedly engaged partially within said first portion (24).

13. An assembly as set forth in claim 12 further characterized by said mounting means comprising a flange (28) extending radially outwardly from said first tubular portion (24) to connect said housing means (16) to the reservoir wall.

14. An assembly as set forth in claim 13 further characterized by said flange (28) spaced from the end of said first tubular portion (24) to provide for mounting stability to said reservoir wall.

15. An assembly as set forth in claim 14 further characterized by said flange (28) being sealed to prevent fluid flow therepast.

16. An assembly as set forth in claim 15 further characterized by said sealing means located on the interior of said second tubular portion (26) to prevent fluid penetration therefrom 17. An assembly as set forth in claim 16 further characterized by including a slider member (30) disposed about said first end of said conduit (12) to adjust the overall length of said conduit (12).

18. An assembly as set forth in claim 17 further characterized by said second tubular portion (26) surrounding said slider member (30).

19. An assembly as set forth in claim 18 further characterized by said slider member (30) including a swivel support (32), said swivel cover (34) supported on said swivel support (32).

20. An assembly as set forth in claim 19 further characterized by said conical swivel cover (34) in wiping engagement with said core element (14) to wipe same as it passes therethrough.

21. An assembly as set forth in claim 20 further characterized by including a latching means engageable with the slider member (30) for controlling the longitudinal movement thereof.

22. An assembly as set forth in claim 21 further characterized by said latching means including latch members (36) for engaging said slider member (32) for means of adjustability.

23. An assembly as set forth in claim 22 further characterized by including biasing means for urging said latching members into engagement with said slider member at a control rate or load.

24. An assembly as set forth in claim 23 further characterized by said biasing means being a spring (38).

* * * * *